United States Patent
Xiong et al.

(10) Patent No.: US 11,079,322 B2
(45) Date of Patent: Aug. 3, 2021

(54) GAS ANALYZER AND GAS ANALYZING METHOD

(71) Applicant: HUBEI CUBIC-RUIYI INSTRUMENT CO., LTD, Wuhan (CN)

(72) Inventors: Youhui Xiong, Wuhan (CN); Jingwei Cheng, Wuhan (CN); Liangshun Yi, Wuhan (CN); Pingjing Shi, Wuhan (CN); Mingliang He, Wuhan (CN)

(73) Assignee: HUBEI CUBIC-RUIYI INSTRUMENT CO., LTD, Wuhan (CN)

( * ) Notice: Subject to any disclaimer, the term of this patent is extended or adjusted under 35 U.S.C. 154(b) by 0 days.

(21) Appl. No.: 16/832,020

(22) Filed: Mar. 27, 2020

(65) Prior Publication Data
US 2020/0225150 A1 Jul. 16, 2020

Related U.S. Application Data

(63) Continuation of application No. PCT/CN2018/100767, filed on Aug. 16, 2018.

(51) Int. Cl.
*G01N 21/3504* (2014.01)
*G01N 21/25* (2006.01)

(52) U.S. Cl.
CPC ....... *G01N 21/3504* (2013.01); *G01N 21/255* (2013.01)

(58) Field of Classification Search
CPC .................. G01N 21/3504; G01N 21/255
See application file for complete search history.

(56) References Cited

U.S. PATENT DOCUMENTS

| 2,924,713 A | 2/1960 | Liston |
| 6,166,383 A | 12/2000 | Kimmig et al. |
| 2008/0011952 A1 | 1/2008 | Fabinski et al. |

FOREIGN PATENT DOCUMENTS

| CN | 85105061 A | 12/1986 | |
| CN | 201110446224.1 A | 7/2012 | |
| CN | 201210297814.7 A | 12/2012 | |
| CN | 201710720122.1 A | 11/2017 | |
| CN | 201721047840.9 U | 3/2018 | |
| EP | 2551662 A1 * | 1/2013 | ......... G01N 21/3504 |

* cited by examiner

*Primary Examiner* — Jamil Ahmed
(74) *Attorney, Agent, or Firm* — Andrew C. Cheng

(57) ABSTRACT

A gas analyzer includes a reference gas chamber and a measurement gas chamber in a single cavity, and a micro-flow infrared gas detection device. A water adjustment device is disposed in the micro-flow infrared gas detection device. By identifying the overlapping phenomenon of the absorption spectrums of the gaseous water and the gas to be measured and by taking advantage of the difference between the infrared absorption spectrums of the gaseous water and the gas to be measured, the water adjustment valve is adjusted to change the velocity variation due to the expansion of the gas in front and rear gas chambers and the water adjustment buffer gas chamber of the micro-flow infrared gas detection device, such that the detected infrared spectrum is located within the absorption spectrum of the gas to be measured while away from the absorption spectrum of the gaseous water, thus addressing the water interference issue.

13 Claims, 5 Drawing Sheets

GAS ANALYZER AND GAS ANALYZING METHOD

CROSS REFERENCE TO RELATED APPLICATION

This non-provisional patent application is a continuation application of international application No. PCT/CN2018/100767 filed on Aug. 16, 2018, which claims priority from Chinese patent application No. 201710720122.1 filed on Aug. 21, 2017, the entire content of which is incorporated herein by reference.

TECHNICAL FIELD

The invention relates to the field of gas analysis, and particularly relates to a gas analyzer and a gas analyzing method.

BACKGROUND

As environmental pollution is increasingly serious, the monitoring and analysis of pollutants are enhanced around the world. The prior art proposes to measure and monitor the gas to be measured by using a non-spectroscopic infrared scattering method (NDIR) principle. Specifically, infrared absorption characteristics of components such as SO2, NO, CO2, CO and the like in the flue gas is analyzed according to the Lambert-Beer law to determine the component concentration of the measurement gas. With the more stringent environmental laws and regulations, measurement of SO2, NO, CO is gradually required to use an ultra-low scale. For an ultra-low scale of 0-100 mg/m3, in order to achieve a long term drift of 2.5% FS, currently there is no NDIR infrared gas analyzing instruments that can meet this requirement commercially available in the domestic market. Flue gas analyzers adopting a single-beam pneumatic infrared gas sensor (Micro-flow NDIR or Luft microphone NDIR), such as the Siemens U23 and the ZRJ series of Fuji, also become gradually unable to meet the environmental protection monitoring requirements of ultra-low scale 0-100 mg/m3.

Internationally, there is already relatively mature experience in the field of CEMS monitoring instruments. SIEMENS, FUJI and ABB have all proposed new flue analyzers using dual-beam pneumatic infrared sensors. For example, in a "Non-dispersive infrared (NDIR) dual trace gas analyzer and method for determining a concentration of a measurement gas component in a gas mixture by the gas analyzer" proposed by SIEMENS AKTIENGESELLSCHAFT in patent document US20130843391A1, the gas chamber is a fork-shaped double-tube double-gas-chamber structure, which has a large volume, is adverse to the miniaturization of the instrument, requires a complicated process and structure with high cost; the sensor uses a double-layer photo-aerodynamic structure (micro-flow sensor), wherein the measured airflow flows leftward and rightward relative to the light source emission direction, and it cannot prevent moisture from interfering with the measurement gas; in addition, the infrared light source uses a beam splitter, which causes infrared light reflection, leading to signal loss and inaccurate measurement. In the patent document EP0093939A1, in a "Non-dispersive infrared gas analyzer" proposed by FUJI ELECTRIC CO. LTD, the gas chamber is a single-gas-chamber without reference gas, and the sensor uses a double-layer photo-aerodynamic structure (micro-flow sensor), wherein measurement airflow flows forward and rearward relative to the emission direction of the light source, the measurement may be easily affected by external environmental factors (light source, temperature, etc.) and may have a large drift and poor stability. In the patent document EP2551662A1, in an "Optical gas analysis device with resources to improve the selectivity of gas mixture analyses" proposed by ABB TECHNOLOGY AG, a half-spaced gas chamber is used, the defect of which is that photo-pneumatic sensors (microphone sensors) are used, the measured airflow flows leftward and rightward relative to the emission direction of the light source, thus unable to avoid the interference of moisture on the measurement.

SUMMARY

In order to address the shortcomings of prior art, the present invention provides a gas analyzer and a gas analyzing method which adopt the half-spaced gas chamber technology in combination with a micro-flow infrared gas detection device that is resistant to water-interference and in which gasflow flows forward and backward, to achieve the analysis of the concentration of the gas to be measured with enhanced measurement accuracy and stability, which can meet the low-scale measurement requirement.

In one aspect, the present invention provides a gas analyzer, comprising:

at least one cavity, with a partition plate provided along a central axis of the cavity to divide the cavity into a reference gas chamber and a measurement gas chamber;

a light source module disposed at one end of the cavity; and a micro-flow infrared gas detection device configured to detect intensity of light emitted by the light source module and passing through the cavity, and arranged at the other end of the cavity.

Preferably, the partition plate has the same length as the cavity, and the partition plate divides the cavity into the reference gas chamber and the measurement gas chamber having the same size and shape.

Preferably, the micro-flow infrared gas detection device comprises a front gas chamber, a rear gas chamber, a micro-flow infrared sensor and a water adjustment device, for detecting the intensity of the light emitted from the light source module and traveling through the cavity.

Preferably, the light source module comprises alight source, a motor, and a light switch plate.

Preferably, the micro-flow infrared gas detection device comprises a front gas chamber, a rear gas chamber, a micro-flow infrared sensor, and a water adjustment device for eliminating the influence of moisture. The water adjustment device comprises a water adjustment valve, a water adjustment buffer gas chamber, and a connection pipe for connecting the water adjustment buffer gas chamber and the front and rear gas chambers.

Preferably, the front gas chamber, the rear gas chamber, and the water adjustment device are sequentially arranged along a propagation direction of light emitted by the light source module.

Preferably, the front gas chamber, the rear gas chamber, the water adjustment valve, and the water adjustment buffer gas chamber are sequentially arranged along the propagation direction of the light emitted by the light source module.

Preferably, the light switch plate is connected to the cavity through a second mounting base, and the cavity and the second mounting base are connected through a snap connection. A plurality of screws and threaded holes are disposed between the second mounting base and the cavity for assembly thereof.

Preferably, the light switch plate is provided with a first light-transmitting hole and a second light-transmitting hole, and the light switch plate rotates at an even speed under the driving of the motor, periodically and alternately allowing the light emitted by the light source to radiate into the reference gas chamber through the first light transmitting hole and into the measurement gas chamber through the second light transmitting hole.

Preferably, the light source module further comprises an optical coupler for determining whether the light at the current time is radiated into the reference gas chamber or the measurement gas chamber.

Preferably, the gas analyzer further comprises a thermostatic chamber, and the cavity, the light source module and the micro-flow infrared gas detection device are all placed in the thermostatic chamber.

Preferably, the gas analyzer further comprises a processing unit configured to calculate the concentration of the measurement gas according to the detection results and pre-stored formulas.

In another aspect, the present invention provides a gas analyzing method, comprising the steps of:

S1: filling the measurement gas chamber with a test gas of a known concentration;

S2: filling the reference gas chamber with a reference gas;

S3: periodically and alternately radiating the reference gas chamber and the measurement gas chamber by the light source;

S4: detecting output signals of the reference gas chamber and the measurement gas chamber through the micro-flow infrared gas detection device;

S5: calculating an intensity ratio between the output signals of the reference gas chamber and the measurement gas chamber;

S6: fitting the relationship between the intensity ratio between the output signals of the reference and measurement gas chambers and the known concentration of the test gas by means of interpolation method/lease square method; and S7: introducing a measurement gas and calculating the concentration of the measurement gas according to the relationship determined in step S6.

In still another aspect, the present invention provides a water adjustment method used in a gas analyzer comprising a water adjustment device having a water adjustment valve, a water adjustment buffer gas chamber and a connection pipe for connecting the water adjustment buffer gas chamber and the front and rear gas chambers. The water adjustment method comprises the steps of:

S1: filling a measurement gas into the front gas chamber, the rear gas chamber and the water adjustment buffer chamber;

S2: a reference gas into the measurement gas chamber and obtaining the magnitude of an electrical signal detected by the micro-flow infrared sensor corresponding to the measurement gas chamber; and S3: refilling the measurement gas chamber with a reference gas containing non-condensed water, and adjusting the position of the water adjustment valve such that the magnitude of an electrical signal detected by the micro-flow infrared sensor corresponding to the measurement gas chamber is the same as the electrical signal in step S2.

Preferably, the content of the non-condensed water in the reference gas in step S3 is saturated.

In summary, the gas analyzer provided by the present invention includes at least one cavity. The provision of the partition plate along the central axis divides the cavity into the reference gas chamber and the measurement gas chamber of the same size and shape, which addresses the issues of large drift and poor measurement stability due to the use of single-gas-chamber and the issues of complicated process and structure due to the use of separate dual-gas-chamber. The water adjustment device is added to the micro-flow infrared gas detection device. By identifying the overlapping phenomenon of the absorption spectrums of the gaseous water and the gas to be measured and by taking advantage of the difference between the infrared absorption spectrums of the gaseous water and the gas to be measured, the water adjustment valve is adjusted to change the velocity variation due to the expansion of the gas in the front and rear gas chambers and the water adjustment buffer gas chamber of the micro-flow infrared gas detection device, such that the detected infrared spectrum is located within the absorption spectrum of the gas to be measured while away from the absorption spectrum of the gaseous water. This addresses the water interference issue, thus achieving an accurate measurement.

It should be understood that the above description is illustrative rather than limiting.

BRIEF DESCRIPTION OF THE DRAWINGS

The invention will hereinafter be further described in conjunction with the appended drawings and embodiments, wherein.

DESCRIPTION OF THE EMBODIMENTS

Figure 1:
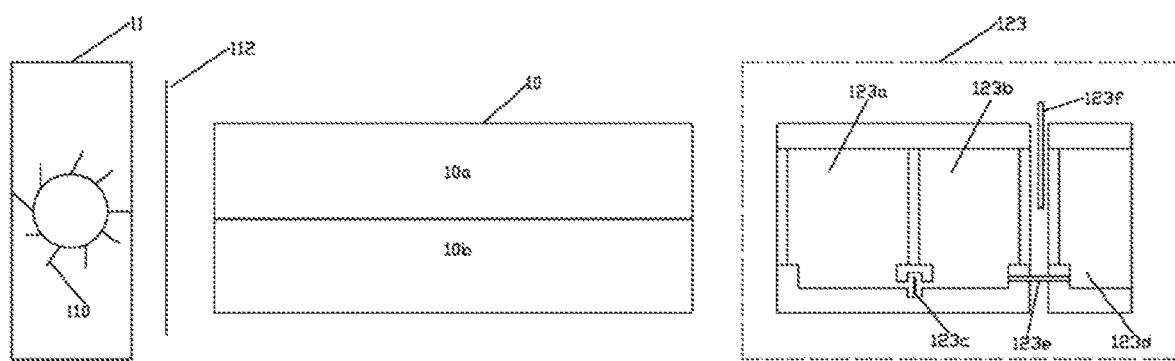
FIG. 1 illustrates a measurement principle of a gas analyzer according to embodiment 1.
Figure 2:
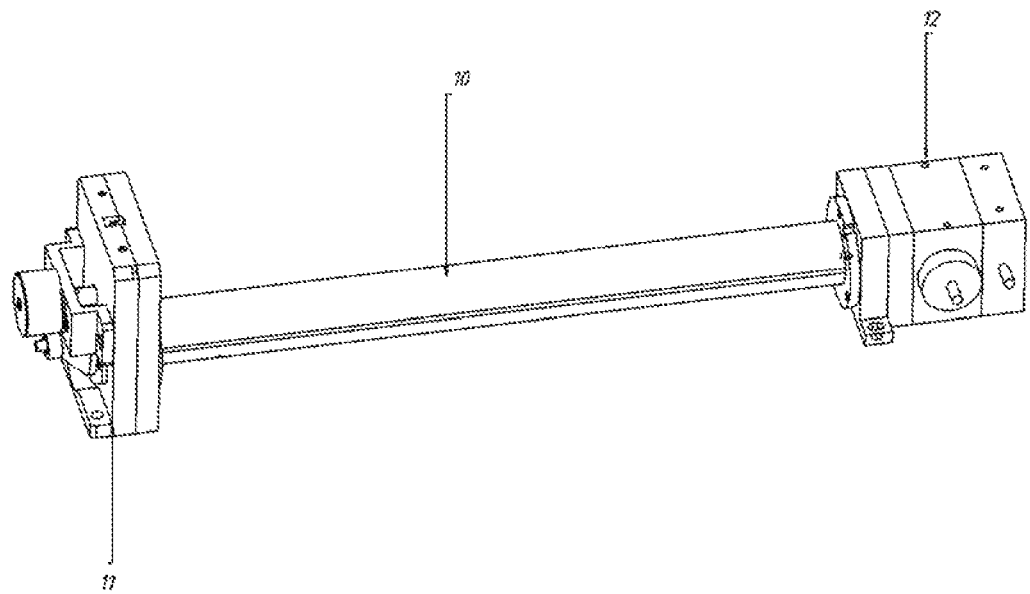
FIG. 2 is an assembled view of a cavity, a light source module and a light receiving module of the gas analyzer according to embodiment 1.
Figure 3:
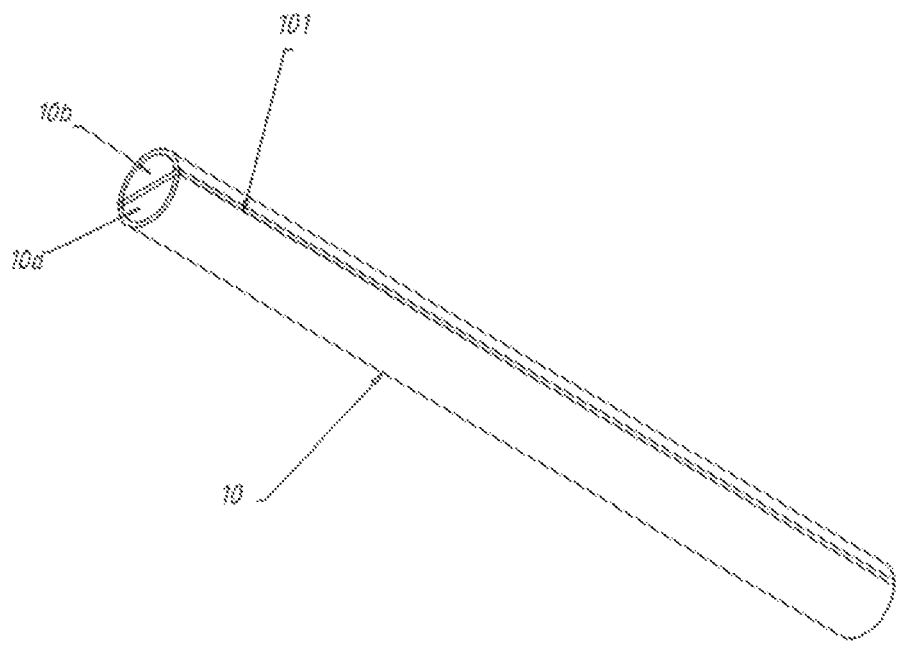
FIG. 3 is a perspective view of the cavity of the gas analyzer according to embodiment 1.

| | |
|---|---|
| Cavity 10 | Light source module 11 |
| Light receiving module 12 | Partition plate 101 |
| Reference gas chamber 10a | Measurement gas chamber 10b |
| Light source 110 | Motor 111 |
| Light switch sheet 112 | First light transmitting hole 112a |
| Second light transmitting hole 112b | First mounting base 111a |
| Second mounting base 111b | Flange plate 120 |
| Third mounting base 121 | Filter 122 |
| Micro-flow infrared gas detection device 123 | Front gas chamber 123a |
| Rear gas chamber 123b | |
| Micro-flow infrared sensor 123c | |
| Water adjustment buffer gas chamber 123d | |
| Connection pipe 123e | Water adjustment valve 123f |
| Screw 11a | Processing unit 13 |
| Heat dissipation block 114 | Thermostatic chamber 14 |

-continued

Optical coupler 115
Mounting position for optical coupler transmitting end 115a
Mounting position for optical coupler receiving end 115b

Embodiment 1

Referring to FIGS. 1-5, gas analyzer includes a cavity 10, a tight source module 11, a light receiving module 12, and a processing unit 13. One end of the cavity 10 is connected to the light source module 11, and the other end of the cavity 10 is connected to the light receiving module 12. The cavity 10 is divided, by a partition plate 101 provided along the central axis of the cavity 10, into two gas chambers of the same size and the same shape, that is, a reference gas chamber 10a and a measurement gas chamber 10b. In this embodiment, the reference gas chamber 10a and the measurement gas chamber 10b are symmetrically disposed with respect to the partition plate 101. The cross-sections of the reference gas chamber 10a and the measurement gas chamber 10b are semi-circular. It should be understood that, in practical applications, the cross sections of the reference gas chamber 10a and the measurement gas chamber 10b being rectangular or of other geometric shapes are all within the protection scope of this application.

The partition plate 101 has the same length as the cavity 10. The partition plate 101 and the cavity 10 are connected by Welding to prevent leakage of the light source.

By providing a partition structure (partition plate 101) in the cavity 10, the volume of the entire measuring instrument can be reduced, the cost can be reduced, and the consistency of the reference gas chamber 10a and the measurement gas chamber 10b can be ensured thereby reducing detection result error due to inconsistency of the reference gas chamber 10a and the measurement gas chamber 10b.

Usually, one cavity 10 can only measure one kind of measurement gas. The reference gas chamber 10a of the cavity 10 is filled with a reference gas that does not absorb light emitted by the light source, such as N2. An air inlet and an air outlet are provided at the measurement gas chamber 10b for the measurement gas to flow in and out. In order to measure a plurality of gases at the same time, a plurality of cavities 10 can be provided in the gas analyzer at the same time. In the drawings of this embodiment, only two cavities 10 are provided for illustration.

The light source module 11 emits radiation light having an absorption wavelength band containing an absorption spectrum of the measurement gas. The light source module 11 includes a light source 110, a motor 111, and a light switch sheet 112. The light source 110 and the motor 111 are connected to the light switch sheet 112 through the first mounting base 111a. The motor 111 is disposed on a motor mount. The light switch sheet 112 is connected to the cavity 10 through the second mounting base 111b.

The cavity 10 is connected to the second mounting base 111b via a snap structure. In order to prevent light, drift caused by radial movement of the light source 110, the second mounting base 111b and the cavity 10 are securely connected together by a plurality of screws 11a engaged in threaded holes which are arranged between the second mounting base 111b and the cavity 10.

The positions of the first mounting base 111a and the second mounting base 111b are opposite to each other, and circular holes matching the size and shape of the cavity 10 are defined at the corresponding positions of the first mounting base 111a and the second mounting base 111b to ensure that the light emitted by the light source 110 can be radiated into the cavity 10. The light switch sheet 112 defines a first light-transmitting hole 112a and a second light-transmitting hole 112b. The light switch sheet 112 rotates at a uniform speed under the driving of the motor 111, and periodically and alternately transmits the light emitted by the light source 110 through the first light-transmitting hole into the reference gas chamber 10a and through the second light transmitting hole 112b into the measurement gas chamber 10b.

For example, the motor 111 rotates at a constant speed at a frequency of ten times per second. In this way, when the motor 111 rotates, the reference gas chamber 10a and the measurement gas chamber 10b are exposed to the light source ten times and blocked from the light source ten times within one second.

The measurement gas in the measurement gas chamber 10b absorbs infrared light emitted by the light source 110, and the reference gas N2 in the reference gas chamber 10a does not absorb infrared light emitted by the light source 110.

The light receiving module 12 receives light emitted from the light source module 11 and reached the light receiving module 12 through the cavity 10. The light receiving module 12 includes a flange plate 120, a third mounting base 121, a filter 122, and a micro-flow infrared gas detection device 123.

The cavity 10 is connected to the micro-flow infrared gas detection device 123 through the flange plate 120. The filter 122 is provided between the cavity 10 and the micro-flow infrared gas detection device 123. The filter 122 can eliminate or reduce scattering and the influence of interference components and allow the infrared light with a characteristic absorption wavelength to pass.

The light travels through the cavity 10 and reaches the micro-flow infrared gas detection device 123 which converts the received light signal into an electrical signal. The micro-flow infrared gas detection device 123 may be a sensor that can measure the composition and concentration of a specific gas. For example, it can be a SO2 micro-flow infrared sensor, a NO sensor or another type of sensor. When the micro-flow infrared gas detection device 123 is an SO2 sensor, the micro-flow infrared gas detection device 123 can determine the attenuation of the light intensity in a corresponding absorption band according to the light absorption characteristics of SO2, and convert the detection result into an electrical signal. As shown in FIG. 1, the micro-flow infrared gas detection device 123 includes a front gas chamber 123a, a rear gas chamber 123b, a micro-flow infrared sensor 123c, and a water adjustment device. The water adjustment device consists of a water adjustment valve 123f, a water adjustment buffer gas chamber 123d, and a connection pipe 123e that connects the water adjustment buffer chamber 123d and the rear gas chamber 123b. A reference gas and a reference gas containing non-condensable water are respectively passed into the measurement gas chamber in sequence. The electrical signals generated by the reference gas containing non-condensable water and the reference gas on the micro-flow infrared gas detection device 123 are caused to have the same magnitude by regulating the water adjustment valve 123f, which can eliminate the influence of moisture on the measurement gas to the greatest extent. Since the rear gas chamber 123b and the water-adjusting buffer gas chamber 123d are connected through the connection pipe 123e, the two chambers can be equivalent to one gas chamber. In this embodiment, the water adjustment valve 123f is a sheet-shaped opaque partition.

Specifically, the water adjustment method in this embodiment is as follows:

S1. The test gas SO2 is filled into the front gas chamber 123a, the rear gas chamber 123b, and the water adjustment buffer gas chamber 123d, and the reference gas chamber 10a is filled with the reference gas N2 from the beginning.

S2. The reference gas N2 is introduced into the measurement gas chamber 10b, and the magnitude of the electrical signal corresponding to the measurement gas chamber measured by the micro-flow infrared sensor 123c is obtained. Since the position of the water adjustment valve 123f when performing this step has little effect on the water adjustment effect of the present invention, the position of the water adjustment valve 123f when performing this step does not need to be strictly limited. However, in this embodiment, for facilitating subsequent adjustment, the water adjustment valve 123f is adjusted in this step to a semi-blocking position with respect to the water adjustment buffer gas chamber 123d.

S3. The reference gas N2 in the measurement gas chamber 10b is released, and the reference gas N2 containing saturated non-condensed water at 4° C. is refilled into the measurement gas chamber 10b. The position of the water adjustment valve 123f is adjusted so that the magnitude of the electrical signal corresponding to the measurement gas chamber detected by the micro-flow infrared sensor 123c is the same as that in step S2. At this time, the water adjustment is completed, the position of the water adjustment valve 123f is fixed, and the position of the water adjustment valve 123f at this time is the final water-adjusted position. The gas analyzer with the water adjusted can be applied to measure gases with various water contents. The reference gas N2 containing saturated non-condensed water at 4° C. can be obtained by passing the reference gas N2 through water at 4° C.

Different from the prior patents, the from and rear gas chambers 123a, 123b, water adjustment valve 123f and water adjustment buffer gas chamber 123d of the micro-flow infrared gas detection device 123 are arranged laterally one after the other in the direction of light propagation. The front and rear gas chambers and the water adjustment buffer gas chamber are filled with a standard gas that can absorb the characteristic absorption peak of the gas component to be measured. For example, they can be filled with standard SO2 or NO gas. Along the light propagation direction, a filter is provided between each two adjacent ones of the front gas chamber 123a, the rear gas chamber 123b, and the buffer gas chamber 123d.

When being irradiated with infrared light, the gas in the front gas chamber 123a is heated and expanded and, at the same time, the received infrared light is absorbed, such that the gas in the rear gas chamber 123b is also thermally expanded. The gas in the front gas chamber 123a is radiated with greater light intensity and hence has a greater expansion coefficient, such that the gas in the front gas chamber 123a flows to the rear gas chamber 23b, forming a gasflow in a front-to-rear direction. When the micro-flow infrared gas detection device 123 is not irradiated with infrared light, the gas slowly returns to the normal state. Because the gas in the front gas chamber 123a partially flows to the rear gas chamber 123b when radiated by the light, when the gas returns to the normal state, the pressure in the front gas chamber 123a decreases, and the gas in the rear gas chamber 123b flows forward until the pressures in the front gas chamber and in the rear chamber become equal. Therefore, a reverse gasflow is generated. The airflow velocity is proportional to the light intensity of the received light signal. The micro-flow infrared sensor 123c converts the change in airflow velocity into a change in electrical signal, and the change in airflow velocity is proportional to the change in electrical signal. Therefore, the micro-flow infrared sensor 123c can convert the change in light intensity of the received light signal into the change in electrical signal.

Due to the wide absorption spectrum of infrared light by gaseous water and narrow absorption spectrum of infrared light by gases such as SO2 and NO, the gas concentration is detected by detecting the attenuation of the light intensity in the band within the corresponding infrared absorption spectrum of the measurement gas that is away from the absorption spectrum of the gaseous water, so as to reduce the interference of gaseous water with the gas detection.

During the test, the micro-flow infrared gas detection device 123 receives light from the reference gas chamber 10a and the measurement gas chamber 10b within a certain time and converts the received light into an electrical signal output.

Figure 4:
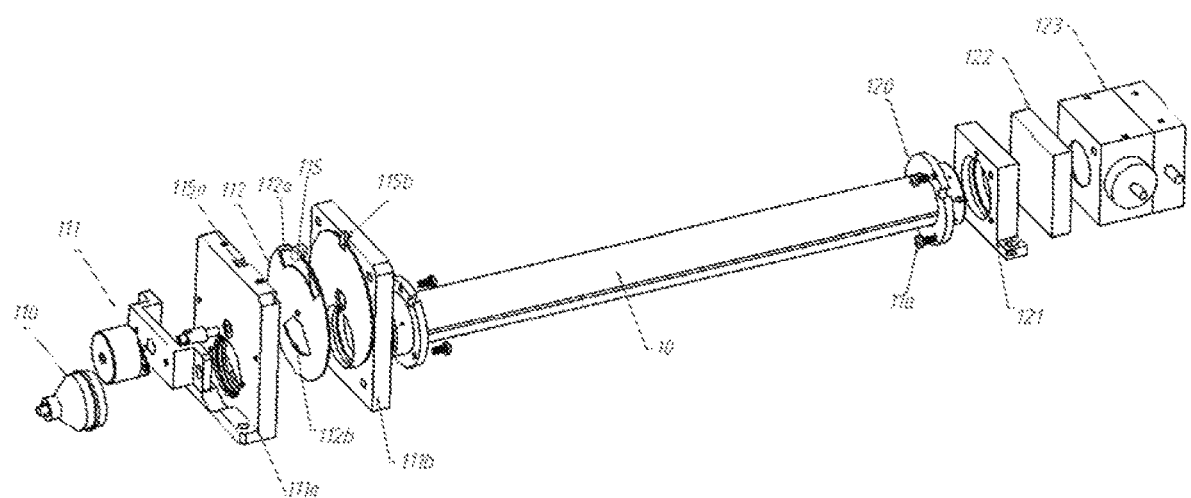
FIG. 4 is an exploded view of the cavity, light source module and light receiving module of the gas analyzer according to embodiment 1.

Referring to FIG. 4, the light source module 11 further includes an optical coupler 115. The optical coupler 115 is used to determine whether the light at the current moment is irradiated into the reference gas chamber 10a of the cavity 10 or into the measurement gas chamber 10b of the cavity 10. The optical coupler 115 includes a transmitting end and a receiving end respectively located on opposite sides of the light switch sheet 112. Upper ends of the first mounting base 111a and the second mounting base 111b are respectively provided with a mounting position 115a for the transmitting end of the optical coupler and a mounting position 115b for the receiving end of the optical coupler.

The frequency of the transmitted signal of the optical coupler 115 is the same as the rotation frequency of the motor 111.

When the light emitted by the light source 110 is irradiated into the measurement gas chamber 10b through the second light transmitting hole 112b, the first light transmitting hole 112a is aligned with the optical coupler 115, and the signal emitted by the transmitting end of the optical coupler 115 passes through the first light transmitting hole 112a and is received by the receiving end of the optical coupler. The receiving end of the optical coupler receives a signal and outputs a high-level signal.

As the motor 111 rotates, the light switch plate 112 also rotates. When the light emitted by the light source 110 is radiated into the reference chamber 10a through the first light-transmitting hole 112a, the first light-transmitting hole 112a deviates from the optical coupler 115. The signal transmitted by the transmitting end of the coupler 115 is blocked, and the receiving end of the optical coupler does not receive the signal, thus outputting a low-level signal.

The receiving end of the optical coupler sends the outputted level signal to the processing unit 13, and the processing unit 13 judges whether the light at the current moment is radiated into the reference gas chamber 10a of the cavity 10 or the measurement gas chamber of the cavity 10 according to the received level. That is whether the light intensity signal detected at the current, moment comes from the measurement gas chamber 10b or the reference gas chamber 10a.

According to Lambert-Beer law, under the same conditions, the absorbance of a gas is proportional to the concentration of the gas.

The light intensity of the light emitted from the light source 110 can be obtained by detecting the light intensity from the reference gas chamber 10a. The detected light intensity S from the measurement gas chamber 10b can be used to obtain the light intensity R of the light emitted from the light source 110 after it has traveled through the measurement gas chamber 10b and absorbed by the gas to be measured, where the ratio of the light intensity which is proportional to the concentration of the gas to be measured.

The processing unit 13 performs de-noising and amplification processing on the electrical signals, calculates the light intensity signals received from the reference gas chamber 10a and the measurement gas chamber 10b, and calculates the concentration of the measurement gas according to the relationship between the concentration of the measurement gas and the ratio of the light intensity. The relationship between the measurement gas concentration and the light intensity ratio is known at the time of shipping out of factory, and the method for obtaining the relationship between the two will be described in the second embodiment.

Figure 5:
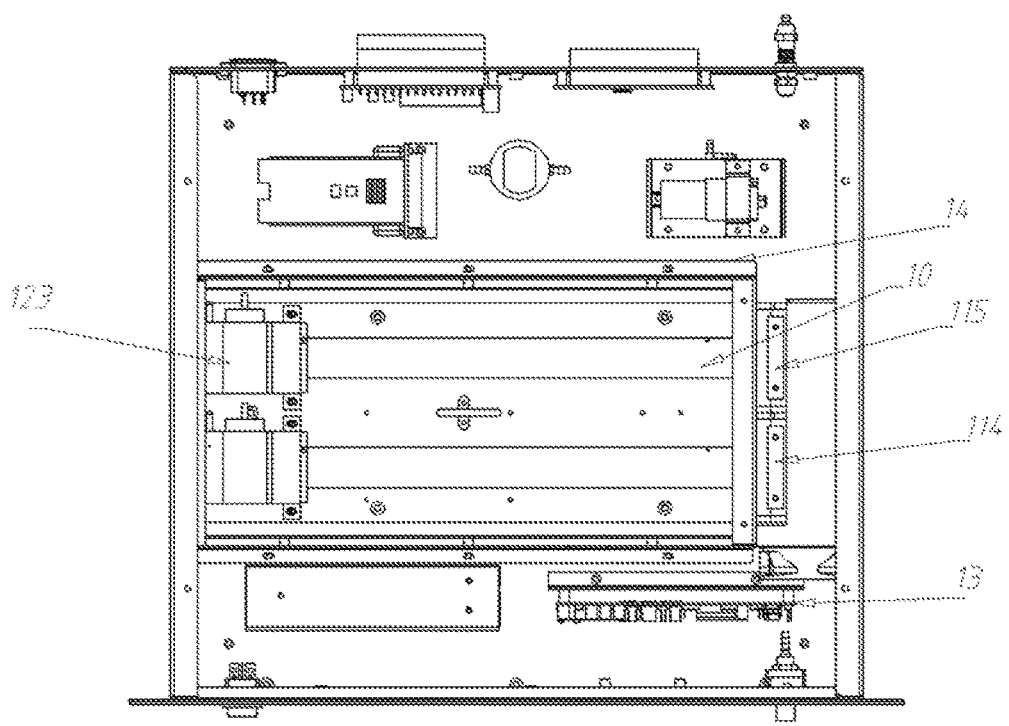
FIG. 5 is an assembled view of the gas analyzer according to embodiment 1.

Referring to FIG. 5, in order to reduce the influence of the temperature drift on the light source, a heat dissipation block 114 is provided adjacent the light source module 11. The heat dissipation block 114 is made of a metal having high thermal conductivity, and is capable of transferring heat emitted from the light source module 11.

Because the gas's absorption rate of the infrared light source is greatly affected by temperature, a thermostatic chamber 14 is disposed in the gas analyzer. The thermostatic chamber 14 is made of aluminium alloy. Foam is provided on an inner wall for thermal insulation, and a heating plate is provided below the thermostatic chamber 14. The cavity 10, the light source module 11 and the light receiving module 12 are all placed in the thermostatic chamber 14.

In order to keep consistent with the actual test environment and reduce the influence of the error of the ambient temperature on the detection results, the temperature of the heating plate is usually controlled by a thermostatic controller, such that the temperature change in the thermostatic chamber 14 does not exceed 2° C. The measurement temperature can be kept constant, such that the temperature drift of the entire gas analysis instrument can be well suppressed.

Of course, the gas analyzer also includes a power supply, a display panel or a communication part, which are common designs and are not repeated herein.

Embodiment 2

Referring to FIGS. 5-8, a gas analyzing method for use in the gas analyzer described in the first embodiment includes the following steps:

S1: The measurement gas chamber 10b is filled with a test gas of a known concentration, and the test gas is described as SO2 by way of example in this embodiment;

S2: N2 is introduced into the reference gas chamber 10a;

S3: The light source 110 emits light into the reference gas chamber 10a and the measurement gas chamber 10b periodically and alternately, the test gas SO2 of known concentration absorbs light emitted by the light source 110, and the reference gas N2 does not absorb light emitted by the light source 110;

S4: The signals of the reference gas chamber 10a and the measurement gas chamber 10b are detected by the micro-flow infrared gas detection device 123, and the intensity S of the light emitted from the measurement gas chamber 10b after the SO2 absorption is received by the micro-flow infrared gas detection device 123 (such as a SO2 micro-flow infrared sensor), and the intensity R of the light emitted from the reference chamber 10a that is, unabsorbed is received by the micro-flow infrared gas detection device 123 (such as the SO2 micro-flow infrared sensor);

S5: An intensity ratio P between the output signals of the reference gas chamber 10a and the measurement gas chamber 10b is calculated as P=S/R:

Specifically, a plurality of P values can be obtained by repeatedly filling test gases with different known concentrations C.

These test gases of different known concentrations C are gases with high-precision known concentrations. These known concentrations of test gases generally contain 0% of the full scale (hereinafter referred to as "FS") of the measurement range, and 100% or other concentration of SO2 gas. 15%, 30%, and 60% of the full scale (hereinafter referred to as "FS") of the measurement range of SO2 gas may also be contained. The following Table 1 shows the experimental data measured during the actual experiment

TABLE 1

| Introducing gas with a known concentration C (mg/m3) | Ratio between output signals of reference gas chamber 10a and measurement gas chamber 10b, P = S/R |
| --- | --- |
| C1: 0 | 1.127 |
| C2: 87.4 | 1.114 |
| C3: 174.8 | 1.098 |
| C4: 349.7 | 1.070 |
| C5: 582.8 | 1.028 |

Figure 6:
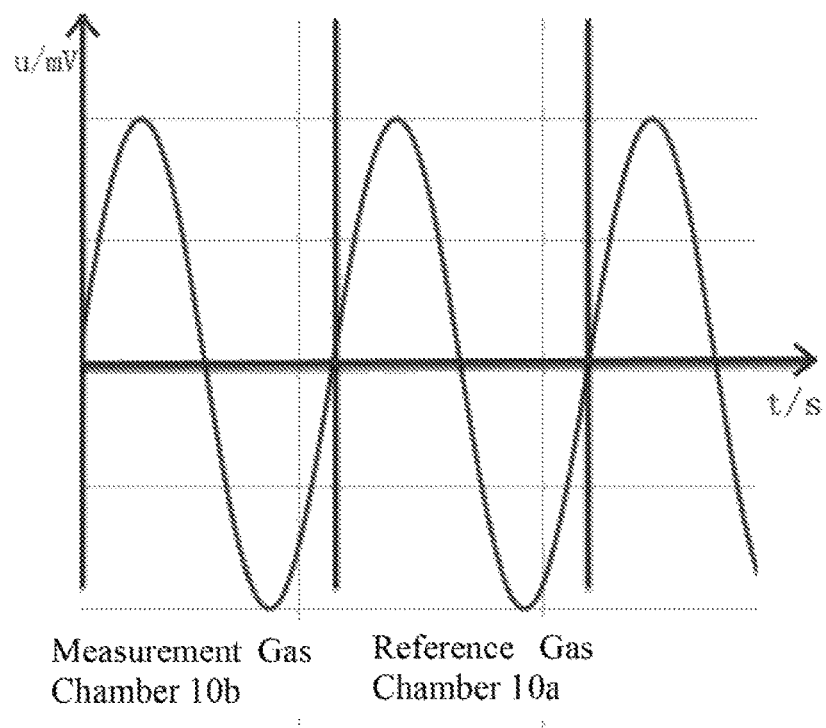
FIG. 6 is a waveform diagram of the outputs of the reference gas chamber and the measurement gas according to a gas analyzing method according to embodiment 2.

When the reference gas chamber 10b is filled with N2 and the measurement gas chamber 10a is not filled with the test gas, the waveform diagram as shown in FIG. 6 may be outputted by an oscilloscope, from which it can be seen that the waveform outputs of the reference gas chamber 10b and the measurement gas chamber 10a are generally the same.

Figure 7:
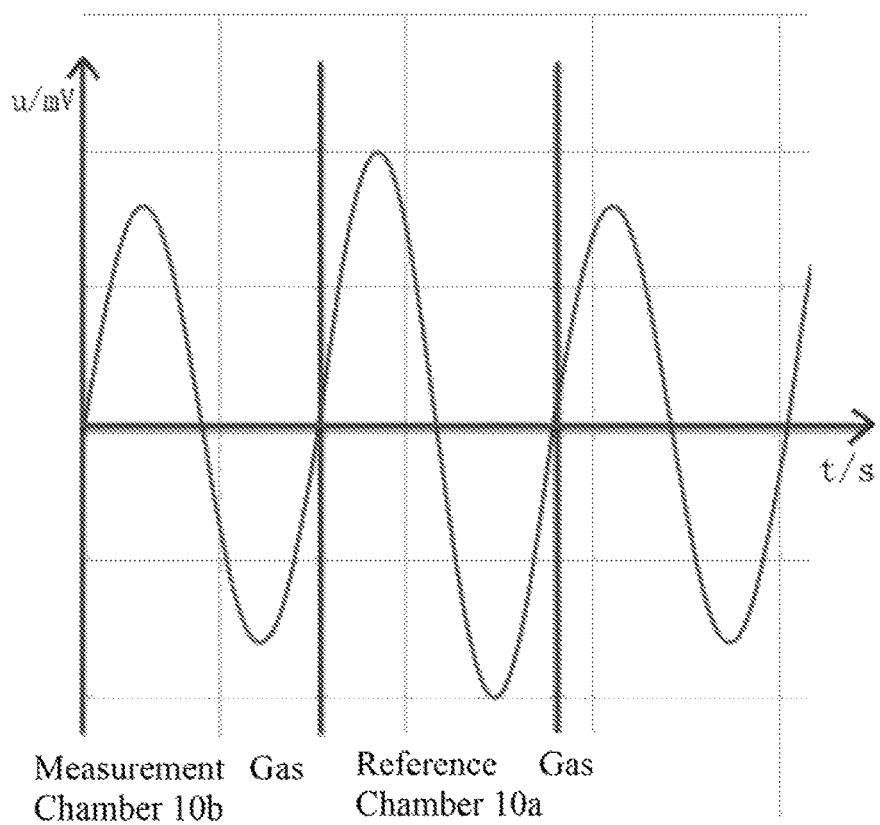
FIG. 7 is a waveform diagram of the outputs of the reference gas chamber and the measurement gas according to a gas analyzing method according to embodiment 2.

When the reference gas chamber 10b is filled with N2 and the measurement gas chamber 10a is filled with the test gas, the waveform diagram as shown in FIG. 7 may be outputted by the oscilloscope, from which it can be seen that the waveform outputs of the reference gas chamber 10b and the measurement gas chamber 10a are different.

Figure 8:
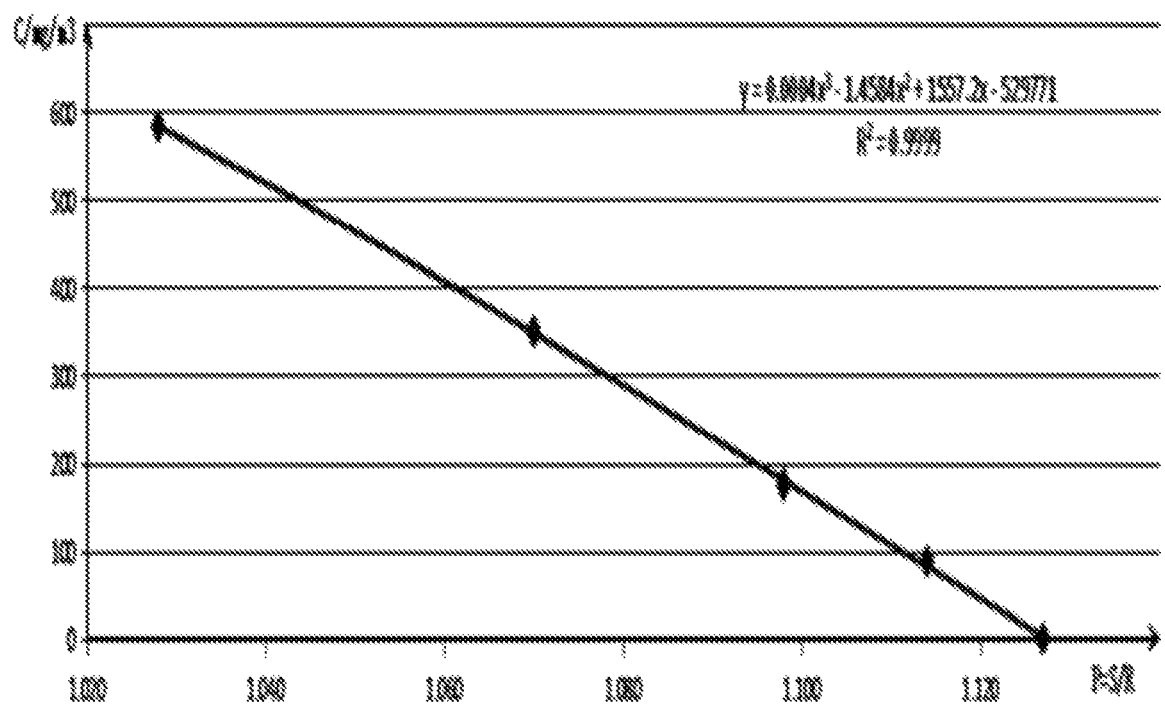
FIG. 8 is a diagram showing a fit curve of the gas analyzing method according to embodiment 2.

S6: The relationship between the signal intensity ratio between the reference gas chamber and the measurement gas chamber and the known test gas concentration can be fitted by means of interpolation method/least square method;

According to the five sets of known data in Table 1, the relationship between the concentration C of the test gas and the intensity ratio P between the output signals of the reference gas chamber 10a and the measurement gas chamber 10b can be fined by means of interpolation method/least square method as follows, which is shown in FIG. 8:

$$C=0.0004P^3-1.4584P^2+15557.2P-529771$$

S7. After the analyzer leaves the factory, the analyzer is filled with the measurement gas during the actual measurement, and the concentration of the measurement gas is calculated according to the relationship determined in step S6.

In summary, the gas analyzing method provided in this embodiment can accurately measure the concentration of the measurement gas.

The specific embodiments described in the present invention are merely illustrative of the spirit of the present invention. It will be apparent to those skilled in the art that various modifications and variations can be made to the disclosed embodiments without departing from the scope or spirit of the invention.

The invention claimed is:

1. A gas analyzer comprising:
   at least one cavity, with a partition plate provided along a central axis of the cavity to divide the cavity into a reference gas chamber and a measurement gas chamber;
   a light source module disposed at one end of the cavity; and
   a micro-flow infrared gas detection device configured to detect intensity of light emitted by the light source module and passing through the cavity, and arranged at the other end of the cavity;
   wherein the micro-flow infrared gas detection device comprises a front gas chamber, a rear gas chamber, a micro-flow infrared sensor, and a water adjustment device for eliminating the influence of moisture;
   wherein the water adjustment device comprises a water adjustment valve, a water adjustment buffer gas chamber, and a connection pipe for connecting the water adjustment buffer gas chamber and the front and rear gas chambers; and
   wherein the front gas chamber, the rear gas chamber, the water adjustment valve, and the water adjustment buffer gas chamber are sequentially arranged along the propagation direction of the light emitted by the light source module.

2. The gas analyzer according to claim 1, wherein the partition plate has the same length as the cavity, and the partition plate divides the cavity into the reference gas chamber and the measurement gas chamber having the same size and shape or similar size and shape.

3. The gas analyzer according to claim 1, wherein the light source module comprises a light source, a motor, and a light switch plate.

4. The gas analyzer according to claim 3, wherein the light switch plate is connected to the cavity through a mounting base, and the cavity and the mounting base are connected through a snap connection.

5. The gas analyzer according to claim 4, wherein the light switch plate is provided with a first light-transmitting hole and a second light-transmitting hole, and the light switch plate rotates at an even speed under the driving of the motor, periodically and alternately allowing the light emitted by the light source to radiate into the reference gas chamber through the first light transmitting hole and into the measurement gas chamber through the second light transmitting hole.

6. The gas analyzer according to claim 3, wherein the light source module further comprises an optical coupler for determining whether the light at the current time is radiated into the reference gas chamber or the measurement gas chamber.

7. The gas analyzer according to claim 3, wherein the light source and the motor is connected to the light switch through a first mounting base, the light switch plate is connected to the cavity through a second mounting base, and the first mounting base and the second mounting base each defining a hole matching the size and shape of the cavity to allow the light emitted by the light source to enter into the cavity.

8. The gas analyzer according to claim 1, wherein the water adjustment valve is a sheet-shaped opaque partition.

9. The gas analyzer according to claim 1, further comprising a heat dissipation block in intimate contact with the light source module and configured to dissipate heat of the light source module.

10. The gas analyzer according to claim 9, further comprising a thermostatic chamber, and the cavity, the light source module and the micro-flow infrared gas detection device are all placed in the thermostatic chamber.

11. A gas analyzing method used in the gas analyzer according to claim 1, wherein the method comprises steps of:
   S1: filling the measurement gas chamber with a test gas of a known concentration;
   S2: filling the reference gas chamber with a reference gas;
   S3: periodically and alternately radiating the reference gas chamber and the measurement gas chamber by the light source;
   S4: detecting output signals of the reference gas chamber and the measurement gas chamber through the micro-flow infrared gas detection device;
   S5: calculating an intensity ratio between the output signals of the reference gas chamber and the measurement gas chamber;
   S6: fitting the relationship between the intensity ratio between the output signals of the reference and measurement gas chambers and the known concentration of the test gas;
   S7: introducing a measurement gas and calculating the concentration of the measurement gas according to the relationship determined in step S6.

12. A water adjustment method used in the gas analyzer according to claim 1, wherein the method comprises steps of:
   S1: filling a measurement gas into the front gas chamber, the rear gas chamber and the water adjustment buffer chamber;
   S2: filling a reference gas into the measurement gas chamber and obtaining the magnitude of an electrical signal detected by the micro-flow infrared sensor corresponding to the measurement gas chamber;
   S3: refilling the measurement gas chamber with a reference gas containing non-condensed water, and adjusting the position of the water adjustment valve such that the magnitude of an electrical signal detected by the micro-flow infrared sensor corresponding to the measurement gas chamber is the same as the electrical signal in step S2.

13. The water adjustment method according to claim 12, wherein the content of the non-condensed water in the reference gas in step S3 is saturated.

* * * * *